2 Sheets--Sheet 1.
W. A. LEWIS.
Improvement in Wheels for Vehicles.
No. 133,043. Patented Nov. 12, 1872.
Fig. 3.
Fig. 1.
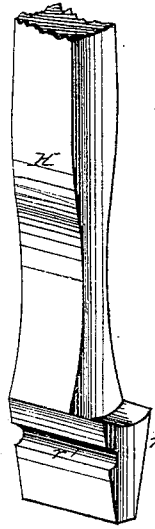
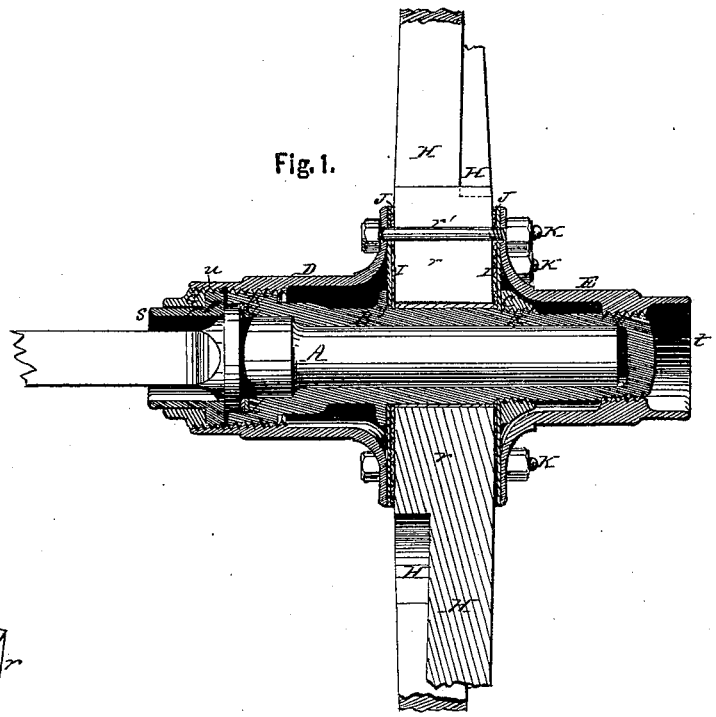
Fig. 2.
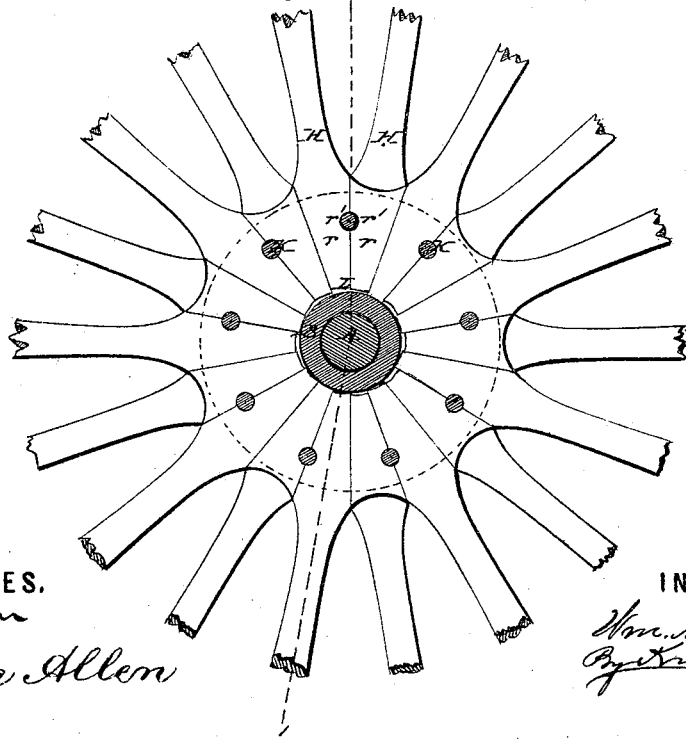
WITNESSES.
Jas. L. Ewin
Walter Allen
INVENTOR.
Wm. A. Lewis
By Knight Bro
Attorneys
AM. PHOTO-LITHOGRAPHIC CO.N.Y. (OSBORNE'S PROCESS.)

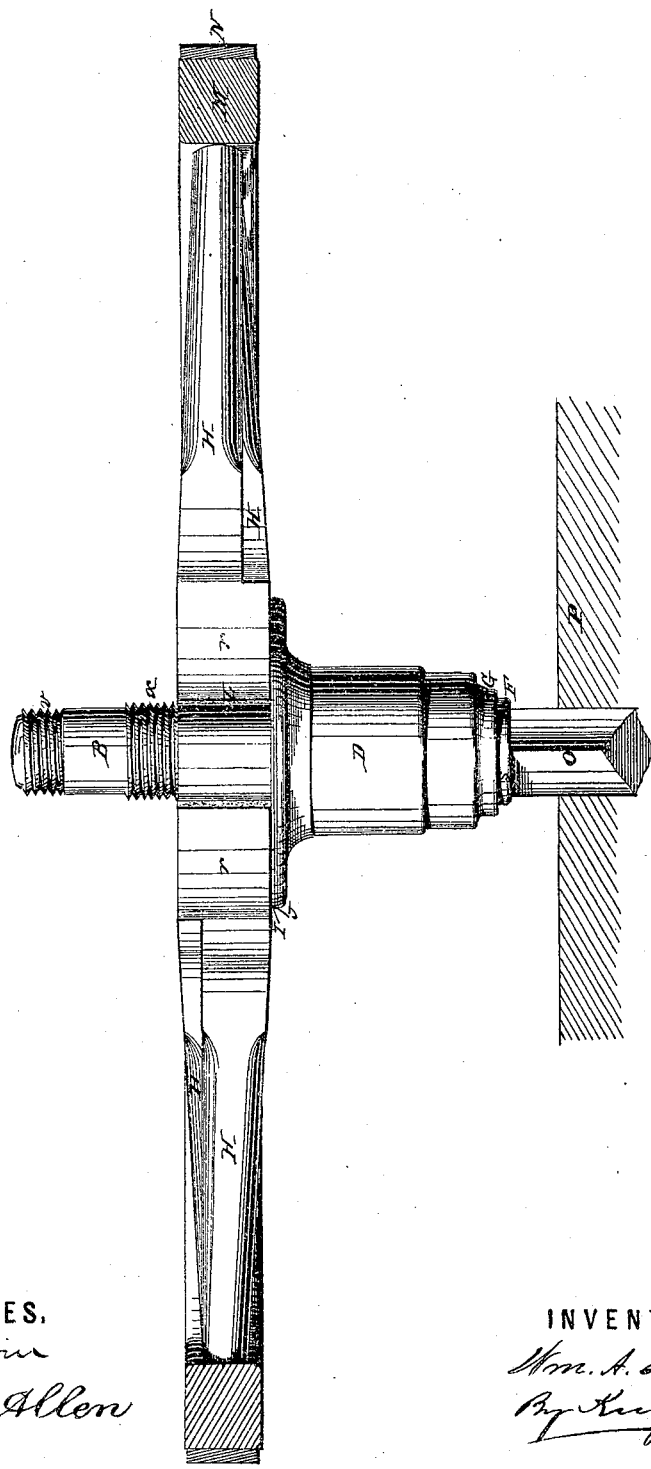

UNITED STATES PATENT OFFICE.

WILLIAM A. LEWIS, OF CHICAGO, ILLINOIS.

IMPROVEMENT IN WHEELS FOR VEHICLES.

Specification forming part of Letters Patent No. 133,043, dated November 12, 1872.

*To all whom it may concern:*

Be it known that I, WILLIAM A. LEWIS, of Chicago, in the county of Cook, Illinois, have invented an Improvement in Wheels, of which the following is a specification:

This invention relates to carriage and wagon wheels, and primarily to those with double web, or dodged, or staggered spokes. The first part of the invention relates to means for centering and setting the box in sector-wheels. The wheel, as composed of the united spokes, felly, and tire, is centered relatively to the box and the space between the inner ends of the spokes, and the box is then filled with molten Babbitt metal, or other suitable soft metal, which, on cooling, effectually sets the box, and also supports each spoke and forms a cushion to take up to some extent the jar. The second part of the invention relates to metallic hubs, and consists, first, in a combination of axle-nut and jam-nut for securing the wheel on the axle; second, in packing or buffers interposed between the spokes and hollow shells, the same consisting of rubber disks and sheet-metal disks to support the same; third, in the combination, with a flanged and threaded box, of a nut to clamp the ends of the spokes against the flange of the box, and hollow shells screwed thereon, and bolts passing through the latter, the whole forming a metallic hub of superior strength, lightness, and beauty. The third part of the invention consists in a peculiar construction of spoke for double-web sector-wheels, each spoke being extended in depth to fill the opposite space in the other set within the hub.

Figure 1 is a longitudinal section of the central portion of a wheel on its axle, which is represented in elevation. Fig. 2 is a transverse section of the hub and axle in the plane of the spokes, the latter being shown in elevation. Fig. 3 is a perspective of the hub end of a spoke. Fig. 4 is a sectional elevation, illustrating the mode of centering and setting the box. The line 1 1, Fig. 2, indicates the plane of Fig. 1.

A represents the axle, which may be of any usual construction, with spindle adapted for the attachment of the wheel at the inner end of the hub. B represents a box or skein with bore fitted to the spindle of the axle A, and with closed outer end. This is made of such length as to extend to the collar of the axle A, and its inner end is adapted to receive said collar and leather washers $z$ behind the same. It is also constructed with a circumferential flange, $y$, near its midlength, and an external screw-thread, $x$, the thickness of spokes removed from the same; also with external threads $w$ $v$ at its extremities. C represents a nut fitted to the thread $x$ of the box B, and D E hollow shells fitted to the threaded ends $w$ $v$ of the same, and furnishing, respectively, an internal screw, $u$, and an ornamental terminal flange, $t$. F represents an axle-nut fitted to the internal thread $u$ of the shell D, and constructed with a long sleeve extension or sand-guard, $s$; and G, a jam-nut sliding on said extension of the axle-nut F, and screwing into said internal screw $u$ behind said axle-nut. The axle-nut F serves to fasten the wheel on the axle A by screwing against the face of the axle-collar, and, by its adjustment, compresses the washers $z$ to a greater or less extent. The jam-nut G sets said axle-nut at any point, and is also a safety or lock nut to prevent the axle-nut from loosening and the wheel coming off. The several parts of the metallic hub above described may be cast and fitted in usual manner. H H represent wooden spokes, with single width sector-shaped ends $r$, extended in depth to the thickness of the two sets. The sector $r$ of each spoke thus occupies the opposite space in the other set within the hub line, so as to form a solid central section of the hub, as illustrated in Fig. 2. I I represent annular rubber disks and J J corresponding disks, of sheet metal, applied between the spokes H and the hollow faces of the shells D E, the former (I) as cushions or buffers to fit and protect the faces of the spokes, and the latter (J) as supports. K K represent bolts passing through the lips of the shells D E, and through the cushion-disks I J and spokes H, to more effectually secure the latter. To receive these bolts the shells D E and disks I J are perforated, and the respective spokes H are each constructed with a semi-cylindrical groove, $r^1$, Fig. 3, in one side. Each spoke of the double set is thus independently held by a bolt to each pair of spokes. L represents a filling of Babbitt metal, or other suitable soft metal, poured into the space between the ends of the spokes H and the box B, to set the latter, and to properly support and cushion each spoke.

The wheel is put together and applied as follows: The sector-spokes H are first united with a felly, M, and the tire N applied. The box B, with one set of cushion-disks, I J, resting on its flange $y$, and with or without the inner shell D, axle-nut F, and jam-nut G, is mounted on a vertical mandrel or spindle, O, supported in a table, P, as represented in Fig. 4. The wheel H M N is then placed thereon, and centered by its periphery. When this is accomplished, a small quantity of molten Babbitt metal, or other soft metal, is poured into the space between the ends of the spokes and the box, as represented at L, which, when cold, sets the box and forms a support for the spokes, adapted to take up to considerable extent any jar which the spokes might receive by blows on the rim or through the box. The wheel is completed by the application of the outer cushion-disks I J, nut C, shell E, and bolts K, and is attached to the axle by first applying the washers $z$, then the axle-nut F, and finally the jam-nut G.

What I claim as new herein is—

1. The soft-metal filling L, in combination with sector-spokes and a metallic box, for setting the latter and supporting and cushioning the spokes, substantially as described.

2. The axle-nut F, applied at the inner end of the hub, and constructed with the sleeve extension $s$, in combination with the jam-nut G, sliding on said extension and screwing into the same thread behind said axle-nut, as and for the purpose set forth.

3. The packing or buffers, composed of the rubber disks I and supporting-disks J, of sheet metal, in combination with hollow-faced metallic hub-shells D E, as and for the purposes specified.

4. The improved metallic hub composed of the box B with external flange $y$ and screw-threads $x\ w\ v$, the nut C, shells D E, and bolts K, constructed and combined substantially as and for the purpose herein described.

5. A wooden spoke for double-web sector-wheels, constructed with single-width sector $r$ extended in depth to fill the opposite space in the other set within the hub, substantially as herein shown and described.

To the above specification of my improvement in hubs and wheels I have hereunto set my hand this 14th day of February, 1872.

WM. A. LEWIS.

Witnesses:
J. R. COMPTON,
OCTAVIUS KNIGHT.